US011440633B2

(12) United States Patent
Jehangir et al.

(10) Patent No.: US 11,440,633 B2
(45) Date of Patent: Sep. 13, 2022

(54) ELECTRICALLY-POWERED UNMANNED MARINE VEHICLE AND METHOD OF MAKING SAME

(71) Applicant: Blue Robotics Inc., Torrance, CA (US)

(72) Inventors: Rustom F. Jehangir, Redondo Beach, CA (US); Joseph A. Spadola, El Segundo, CA (US); Adam Simko, Torrance, CA (US)

(73) Assignee: Blue Robotics Inc., Torrance, CA (US)

( * ) Notice: Subject to any disclaimer, the term of this patent is extended or adjusted under 35 U.S.C. 154(b) by 0 days.

(21) Appl. No.: 16/674,533

(22) Filed: Nov. 5, 2019

(65) Prior Publication Data

US 2020/0094934 A1 Mar. 26, 2020

Related U.S. Application Data

(63) Continuation of application No. 15/945,957, filed on Apr. 5, 2018, now abandoned, which is a
(Continued)

(51) Int. Cl.
*B63H 23/24* (2006.01)
*B63H 1/20* (2006.01)
(Continued)

(52) U.S. Cl.
CPC .............. *B63H 23/24* (2013.01); *B63H 1/20* (2013.01); *B63H 5/15* (2013.01); *B63H 21/17* (2013.01);
(Continued)

(58) Field of Classification Search
CPC .......... H02K 11/33; H02K 5/132; H02K 7/14; H02K 3/44; H02K 21/22; B63H 23/24;
(Continued)

(56) References Cited

U.S. PATENT DOCUMENTS 2,428,816 A  10/1947 Sigmund
3,143,972 A * 8/1964 Smith ................. F04D 13/0646
                                                    417/356
(Continued)

FOREIGN PATENT DOCUMENTS

DE  4030711     2/1992
GB  438867      8/1934
(Continued)

OTHER PUBLICATIONS

International Search Report and Written Opinion for corresponding International Application No. PCT/US2015/028258 dated Jul. 24, 2015.
(Continued)

*Primary Examiner* — Essama Omgba
*Assistant Examiner* — Dnyanesh G Kasture
(74) *Attorney, Agent, or Firm* — Renner, Otto, Boisselle & Sklar, LLP (57) ABSTRACT

An electrically-powered unmanned marine vehicle and method of making same, including providing a hull of the marine vehicle and mounting a submersible electric thruster to the hull via a mounting interface of the thruster. The thruster includes a stator assembly and a rotor assembly. The rotor assembly forms an internal cavity with a plurality of magnets arranged radially outwardly of the internal cavity. The stator assembly includes electrical windings that are disposed within the internal cavity of the rotor assembly. The thruster is configured to allow the internal cavity to be flooded with water when the thruster is submerged, and the electrical windings are encapsulated with a protective barrier that prevents the flooded water from contacting the windings. The thruster of the marine vehicle is thus water cooled, and the electromotive forces provided by the windings
(Continued)

generate sufficient thrust to propel the marine vehicle through the water.

22 Claims, 7 Drawing Sheets

Related U.S. Application Data continuation-in-part of application No. 14/699,478, filed on Apr. 29, 2015, now Pat. No. 9,963,212.

(60) Provisional application No. 61/986,945, filed on May 1, 2014.

(51) Int. Cl.
| | | |
|---|---|---|
| *B63H 5/15* | (2006.01) | |
| *B63H 21/17* | (2006.01) | |
| *H02K 5/132* | (2006.01) | |
| *H02K 7/14* | (2006.01) | |
| *H02K 3/44* | (2006.01) | |
| *B63H 21/21* | (2006.01) | |
| *H02K 11/33* | (2016.01) | |
| *H02K 21/22* | (2006.01) | |
| *B63B 35/00* | (2020.01) | |
| *B63H 11/08* | (2006.01) | |

(52) U.S. Cl.
CPC ............. *B63H 21/21* (2013.01); *H02K 3/44* (2013.01); *H02K 5/132* (2013.01); *H02K 7/14* (2013.01); *H02K 11/33* (2016.01); *B63B 2035/006* (2013.01); *B63B 2209/18* (2013.01); *B63B 2211/02* (2013.01); *B63H 2011/081* (2013.01); *B63H 2021/216* (2013.01); *H02K 21/22* (2013.01)

(58) Field of Classification Search
CPC . B63H 1/20; B63H 5/15; B63H 21/17; B63H 21/21; B63H 2011/081; B63H 2021/216; B63H 2005/1258; B63B 2035/006; B63B 2209/18; B63B 2211/02
USPC ...................................................... 440/6, 23
See application file for complete search history.

(56) References Cited

U.S. PATENT DOCUMENTS

| | | | | |
|---|---|---|---|---|
| 3,791,331 | A * | 2/1974 | Dilley ................... | B63H 23/24 440/6 |
| 3,885,516 | A * | 5/1975 | Uroshevich .............. | B63H 5/14 440/67 |
| 4,492,844 | A | 1/1985 | Asano et al. | |
| 5,252,875 | A | 10/1993 | Veronesi et al. | |
| 6,514,616 | B1 | 2/2003 | Gandi | |
| 6,837,757 | B2 | 1/2005 | Van Dine et al. | |
| 6,916,160 | B2 | 7/2005 | Obara | |
| 7,112,906 | B2 * | 9/2006 | Chou ................... | H02K 1/2786 310/156.12 |
| 7,554,228 | B2 | 6/2009 | Franz et al. | |
| 8,512,084 | B1 | 8/2013 | Chang et al. | |
| 9,676,460 | B2 * | 6/2017 | Aasebo ................. | B63H 21/17 |
| 2004/0234395 | A1 | 11/2004 | Hatano | |
| 2005/0012411 | A1 * | 1/2005 | Hoffman ............. | F04D 25/0646 310/63 |
| 2005/0181686 | A1 * | 8/2005 | Grimmeisen .......... | B63H 21/17 440/6 |
| 2007/0085426 | A1 * | 4/2007 | Lee .......................... | H02K 5/08 310/43 |
| 2007/0096569 | A1 * | 5/2007 | Fielder ..................... | F04D 3/00 310/40 R |
| 2007/0252458 | A1 * | 11/2007 | Chen ..................... | H02K 5/132 310/87 |
| 2008/0245924 | A1 | 10/2008 | Arlton et al. | |
| 2011/0027075 | A1 * | 2/2011 | Nogami ................ | F04D 29/083 415/182.1 |
| 2012/0251353 | A1 * | 10/2012 | Holesz .................... | B63H 5/14 417/410.1 |
| 2012/0269666 | A1 * | 10/2012 | Lin ........................ | F04D 25/064 417/423.7 |
| 2014/0012236 | A1 | 1/2014 | Williams et al. | |
| 2014/0294621 | A1 * | 10/2014 | Narita ................. | F04D 25/0646 417/354 |
| 2015/0145351 | A1 * | 5/2015 | Porcher ................... | H02K 3/44 310/43 |
| 2017/0166288 | A1 * | 6/2017 | Claus ...................... | H02K 5/00 |

FOREIGN PATENT DOCUMENTS

| | | |
|---|---|---|
| GB | 2476879 | 7/2011 |
| JP | S58163241 | 9/1983 |
| KR | 20110051894 | 5/2011 |

OTHER PUBLICATIONS

International Preliminary Report On Patentability for corresponding International Application No. PCT/US2015/028258 dated Nov. 10, 2016.
Extended European Search Report for corresponding European Application No. 18211431.4 dated Mar. 22, 2019.
Communication pursuant to Article 94(3) for corresponding European Application No. 15722384 dated Dec. 4, 2018.
Communication pursuant to Rules 161(1) and 162 for corresponding European Application No. 15722384 dated Jan. 18, 2017.
Office Action dated May 20, 2021 in corresponding European Patent Application No. 18211431.4.

* cited by examiner

ELECTRICALLY-POWERED UNMANNED MARINE VEHICLE AND METHOD OF MAKING SAME

RELATED APPLICATIONS

This application is a continuation of U.S. application Ser. No. 15/945,957 filed on Apr. 5, 2018, which is a continuation-in-part of U.S. application Ser. No. 14/699,478 filed on Apr. 29, 2015, which claims the benefit of U.S. Provisional Application No. 61/986,945 filed on May 1, 2014, all of which are hereby incorporated herein by reference in their entireties.

FIELD OF THE INVENTION

The present invention relates to an unmanned marine vehicle powered by an electric submersible thruster.

BACKGROUND OF THE INVENTION

Unmanned and robotic marine vehicles, such as remotely operated underwater vehicles (ROVs), autonomous underwater vehicles (AUVs), and autonomous surface vessels (ASVs), have become invaluable tools for marine exploration. They are commonly used for scientific, industrial, commercial, and recreational purposes. These vehicles generally use thrusters for propulsion.

A thruster is a device which provides a thrust force for propulsion or control of a vehicle. Generally, thrusters have an electric motor that is enclosed to seal it from water, a propeller rotatably connected to the motor through a mechanical seal or magnetic coupling, and a nozzle that protects the propeller and increases the thrust of the propeller. Thrusters often use oil compensation to allow operation at greater depths. U.S. Pat. Nos. 6,837,757, 8,512,084 describe various embodiments of such devices.

Electric thrusters are powered through an electrical wire that connects the motor to a power source. In most cases, for variable thrust control, the power is supplied through an electronic speed controller. Such controllers are available for different types of motors such as brushed motors and brushless motors.

Synchronous electric motors are commonly used in a wide variety of applications. The thruster described here uses such a motor in the form of an external rotor brushless permanent magnet motor that is similar to those commonly used on model aircraft and computer disk drives. This motor design provides high torque at low rotational speeds without the need for a gearbox or reduction drive. It is simple and comprises a single moving part. The stator and motor windings are at the core of the motor and the permanent magnets are arranged in a radial pattern around the stator. Such motors typically have three phase magnetic windings that are commutated by an electronic speed controller. Sensorless feedback is used by the controller for proper timing of the commutation.

Common thruster designs are generally very large compared to an electric motor of equivalent power that is not sealed from the water. This is a driving factor in the design of many applications such as ROVs. The thrusters of an ROV (remotely operated underwater vehicle) often take up a significant portion of the total vehicle volume.

Electric thrusters are generally limited to depths of around 300-3,000 feet because they have air- or oil-filled cavities that are affected by the very high pressures experienced at depth. The vast majority of the ocean floor is at a much greater depth than this.

Electric thrusters, and in particular those that use mechanical seals, require maintenance as often as every 50 hours of operation to replace seals and add grease. Most ROVs have between three to six thrusters, making maintenance a laborious task. Additionally, for long endurance applications, such as long-endurance ASVs and AUVs, routine maintenance is not an option as the vehicles could be operated for months at a time.

Last, currently available thrusters are prohibitively expensive and consequently restricted from use in many applications such as hobby use, academic use, and small business commercial use. Much of the cost is driven by the complexity and number of parts used in typical designs.

SUMMARY OF THE INVENTION

An aspect of this disclosure relates to a thruster that is small to enable more compact vehicle designs.

Another aspect relates to a thruster that operates at the full depth of the ocean.

Another aspect relates to a thruster that requires zero or minimal maintenance and is able to operate for extended periods of time.

Another aspect relates to a thruster that is affordable for hobbyist, academic, and commercial purposes.

Another aspect relates to a thruster design described here that is a unique approach that addresses all of the above needs.

Another aspect relates to a submersible electric thruster that is compact, operable at high pressures, and operable continuously without maintenance.

Another aspect relates to a unique submersible electric thruster design that has a low number of parts, no enclosed air or oil cavities, and requires minimal maintenance.

Another aspect relates to a submersible electric thruster including one or more of the following and/or a combination of all of the following:

a stator assembly with a base that is an attachment point for other parts of the thruster, a bearing tube that supports the stator and contains the bearings, a ferrous stator mounted on the bearing tube, electromagnetic windings, and a protective coating that completely covers the stator and windings preventing contact with the water;

a rotor assembly with a shaft, a ferrous ring, and a multiplicity of magnets mounted within the ring so that the inner diameter of the magnets is slightly larger than the outer diameter of the stator;

a propeller with a central hub that has an inner diameter slightly larger than the outer diameter of the rotor assembly and is connected co-rotatably about the rotor assembly so that the propeller blades extend radially from the rotational axis of the rotor;

a nose cone that is connected to the front of the thruster;

an electronics unit connected between the stator assembly and the nose cone that contains an electronic speed controller sealed in a protective coating;

an annular nozzle with an inner diameter slightly larger than the diameter circumscribed by the tip of the propeller providing an inlet and outlet for water flow;

a tail cone that is positioned at the rear of the thruster; and a mounting bracket that is securable to the outside of the nozzle and is securable to other surfaces, such as the hull of a vehicle.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments.

Moreover, in the drawings, like reference numerals designate corresponding parts throughout the several views and may be used to designate like or similar parts in more than one embodiment. Also, primed reference numerals may be used to designate parts that are similar to parts designated by the same unprimed reference numeral.

BRIEF DESCRIPTION OF THE DRAWINGS

For a more complete understanding of the invention, reference is made to the following description and accompanying drawings that are not necessarily to scale, in which.

DETAILED DESCRIPTION OF THE PREFERRED EMBODIMENTS

The present embodiments generally relate to a submersible electric thruster that has a number of unique benefits including a compact size, operability at the full depth of the ocean, zero or minimal required maintenance, low number of parts, and low cost relative to currently available alternatives. Unlike most thrusters, which generally consist of a motor disposed in an air or oil filled cavity and connected to a propeller through a mechanical or magnetic connection, the present invention uses a novel design that seals the individual components of the motor without creating any cavities or requiring seals or magnetic couplings. In addition to reducing the size and number of parts, this allows the thruster to operate at extreme pressures at the bottom of the ocean without issue and to operate continuously for extended periods of time without maintenance. These unique features combined with the low number of parts and overall simplicity of the design produce a thruster that is more capable than available alternatives at a significantly lower cost. An embodiment of the invention may be priced to allow hobbyists and students to enter the field of marine robotics, which has traditionally been prohibitively expensive.

The present invention is suitable for a wide variety of applications for manned and/or robotic marine vehicles. As an example, an embodiment of the invention may be used to propel and control an ROV (remotely operated underwater vehicle). Such a vehicle could be designed to operate at the deepest parts of the ocean to explore and study parts of the earth that have never been explored. Such exploration has been limited by the prohibitively high costs of appropriate equipment. The thrusters of the present invention would allow the propulsion system of the vehicle to be capable of operation at such depths at a minimal cost and level of complexity. Similarly, the thrusters of the present invention could provide an affordable propulsion system to a hobbyist or student seeking to build an ROV with a small budget, enabling a wide range of people to access such vehicles. Additionally, the compact size of the present invention compared to available alternatives would allow more compact vehicle designs. As a further example, an embodiment of the invention may be used to propel and control an ASV (autonomous surface vessel). The ASV could be equipped with a source of electrical power such as solar cells, wind generators, and/or fuel cells as well as sensors and communication equipment to collect and transmit data. The unique design of the present invention would allow the propulsion system of such a vehicle to operate continuously for months or years at a time without maintenance. Such a vehicle may provide meteorological data, oceanographic data, sonar data for sea floor mapping, or other data that benefits knowledge of the world's oceans.

Figure 1:
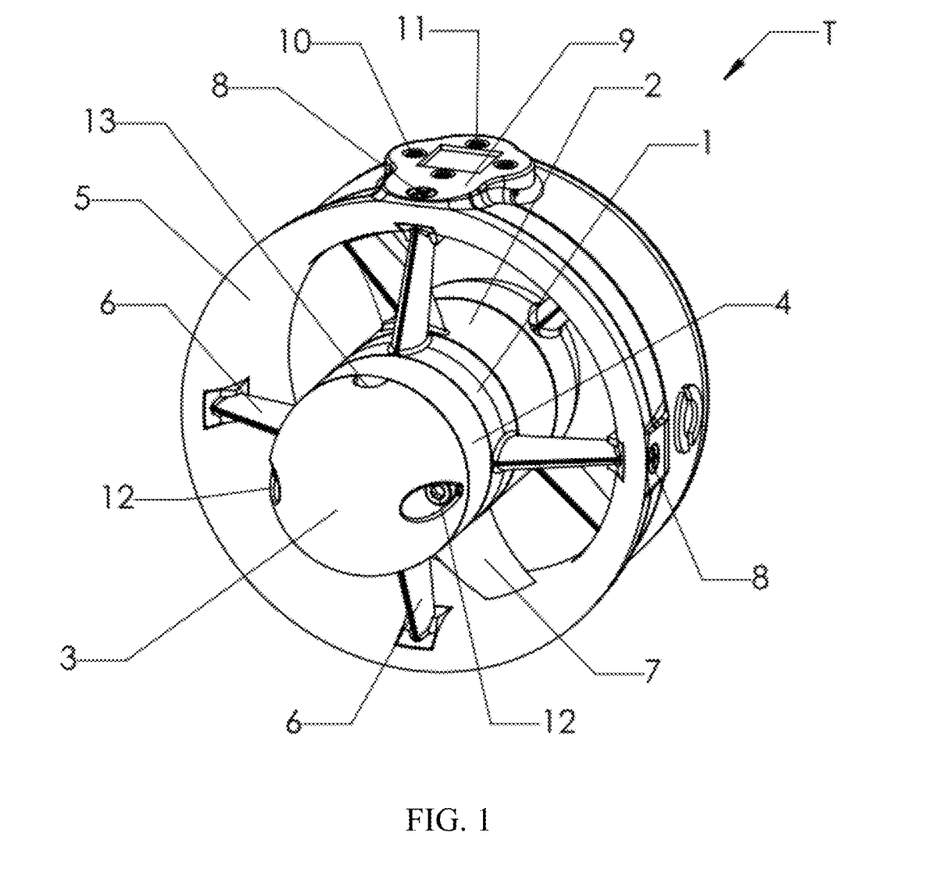
FIG. 1 is an assembled perspective view of an embodiment of a submersible electric thruster according to the invention.
Figure 2:
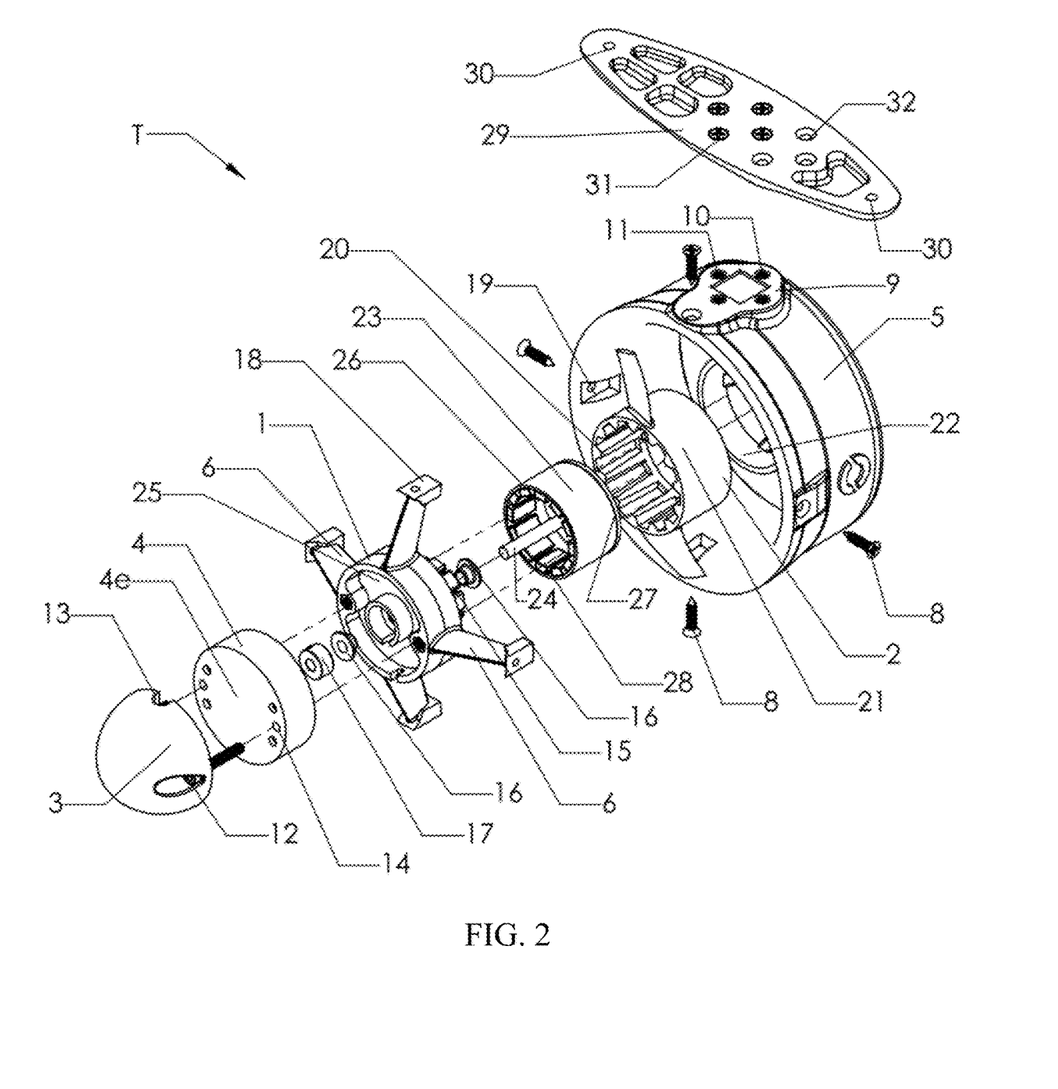
FIG. 2 is an exploded perspective view of the embodiment.
Figure 3:
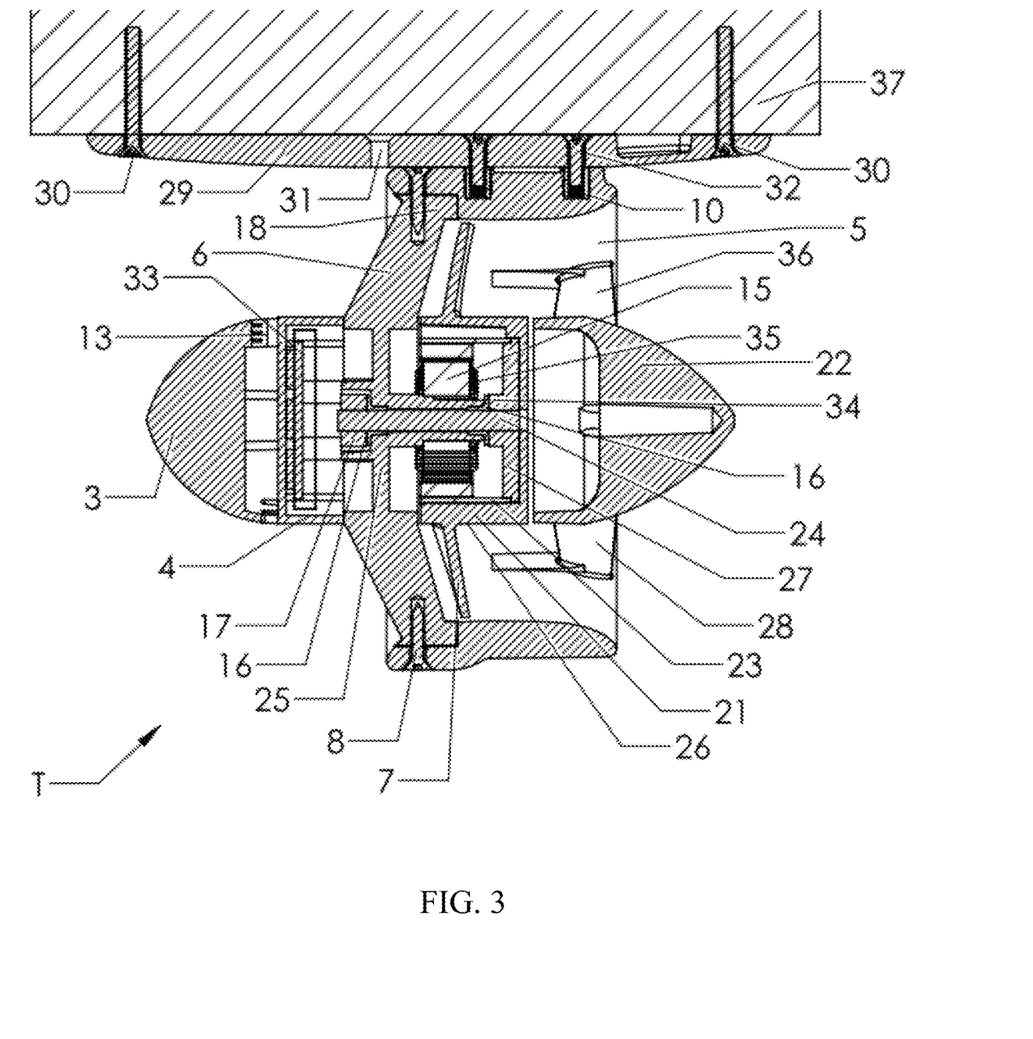
FIG. 3 is a sectional view of the embodiment.

As shown in FIG. 1, FIG. 2, and FIG. 3, an embodiment of a submersible electric thruster T according to the present invention includes a stator assembly 1, a rotor assembly 26, a propeller 2, a nose cone 3, an electronics unit 4, a nozzle 5, a tail cone 22, and a mounting bracket 29.

Figure 4:
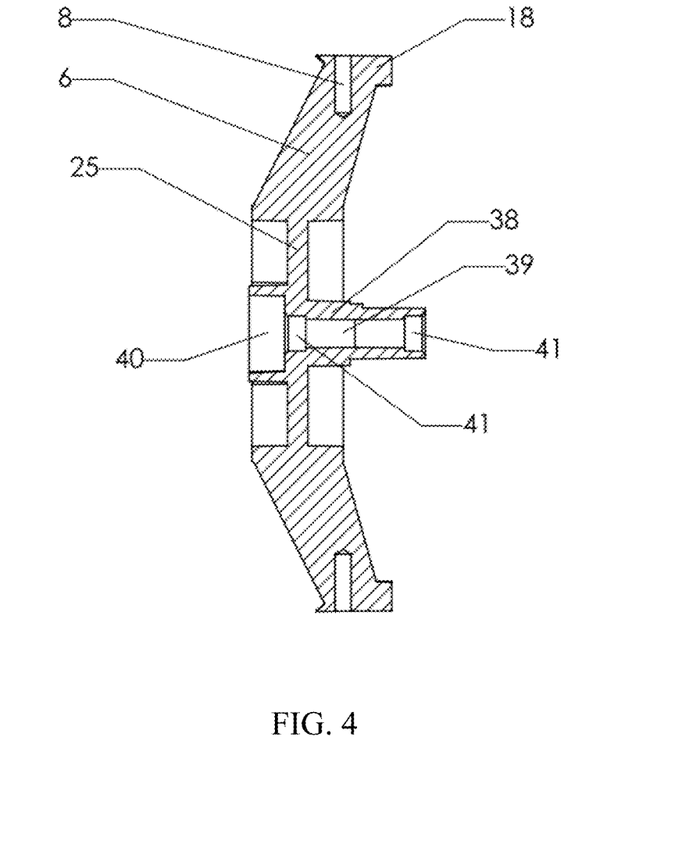
FIG. 4 is a sectional view showing only the base, nozzle arms, and bearing tube of the embodiment.

The stator assembly 1 includes a base 25, a bearing tube 38, bearings 16, a stator 15, electromagnetic windings 35, and a protective coating around the stator and windings. As illustrated in FIG. 4, the base 25 and bearing tube 38 are molded as a single part and the base has four arms 6 that extend to support the nozzle 5. The arms 6 are shaped for low drag using a hydrofoil shape. The end of each arm has a nozzle attachment point 18 that fits into a matching recess 19 on the nozzle.

The bearing tube 38 has a primary inner diameter 39 that is slightly larger than the rotor shaft 24 as well as a larger secondary inner diameter 41 at each end to house the bearings 16. A tertiary inner diameter 40 is slightly larger than the outer diameter of the shaft collar 17 and is positioned at one end of the bearing tube to shield the shaft collar from contact with wires that may be present between the stator assembly 1 and the electronics unit 4 or the nose cone 3. The bearings 16 are high-performance plastic sleeve bearings or bronze sleeve bearings such as Oilite bearings. The bearings may be flanged bearings as shown in the figures of the preferred embodiment or non-flanged bearings. The bearing tube 38 supports the stator 15.

The stator 15 is made of thin laminations of low-carbon steel, as is common in the construction of electric motors.

The stator is coated with a protective coating to prevent electrical shorts between the windings and the stator. In this embodiment of the invention the stator has nine arms but it may use a stator with fewer or more arms. The windings are made of copper magnet wire, as commonly used in the construction of electric motors, and are wound in three phases. A common "Wye" or "Y" termination style is used to provide high torque output. The stator and windings are protected from abrasion and corrosion with a protective coating. As an example, in this embodiment of the invention, the protective coating is an epoxy compound and the stator and windings are dipped in the epoxy allowing the protective coating to fill small air gaps between the windings. A vacuum degassing method is used to ensure that there are no air bubbles trapped in the coating. If such air bubbles existed, they would compress at high pressures and could compromise the strength of the protective coating. Other protective coatings also or alternatively may be used. Alternatively, the stator may be overmolded with a plastic coating for protection. This could be done though injection molding or other plastic fabrication techniques.

The rotor assembly 26 includes a shaft 24, a ferrous ring 23, a rotor base 27, and a multiplicity of permanent magnets 28. The rotor base 27 connects the shaft to the ferrous ring 23 and magnets 28. It is constructed of aluminum. The shaft 24 extends from the rotor base 27 so that when the rotor assembly is installed on the stator assembly 1 the shaft extends through and beyond the length of the bearing tube. When the propeller produces thrust in the forward direction, the rotor base 27 is pressed against the bearing 16. The rotor base 27 has a bearing stand-off 34 to allow room for the electromagnetic windings to extended beyond the stator. A shaft collar 17 is fixed to the end of the shaft that extends through the bearing tube 38. When the propeller produces thrust in the reverse direction, the shaft collar is pressed against the bearing 16. The ferrous ring 23 is connected to the rotor base 27 and extends in the same direction as the shaft 24 so that when the rotor assembly is installed on the stator assembly 1 the ferrous ring 23 extends to overlap the stator assembly. The multiplicity of permanent magnets 28 is arranged about the inner surface of the ferrous ring 23. In this exemplary embodiment of the invention, twelve magnets are used, but a different number of magnets may be used to change the performance characteristics of the thruster. The magnets 28 are arranged so that center of the respective magnets is in line with the axial center of the stator 15. Adjacent magnets are installed with opposite magnetic polarity. The ferrous ring 23 acts to contain and focus the magnetic flux of the permanent magnets and the magnetic flux of the stator and windings.

The propeller 2 is connected to the rotor and converts rotational kinetic energy into thrust. The propeller includes a hub 21 and a multiplicity of blades 7. The propeller hub 21 is cylindrical and closed at one end. Its inner diameter is slightly larger than the outer diameter of the rotor assembly 26 and its length is such that when the propeller 2 is installed on the rotor assembly the propeller and ferrous ring 23 are flush. The inner wall of the hub has slots 20 that reduce the amount of material needed to manufacture the propeller. The closed end of the propeller hub has two holes so that screws can be used to fix the propeller to the rotor assembly 26. The propeller may be designed to spin in the clockwise or counterclockwise direction to provide opposite torque forces that may cancel in applications with multiple thrusters. The propeller blades may be designed to be flexible so that they may bend to relieve foreign objects that are caught in the thruster.

Figure 5:
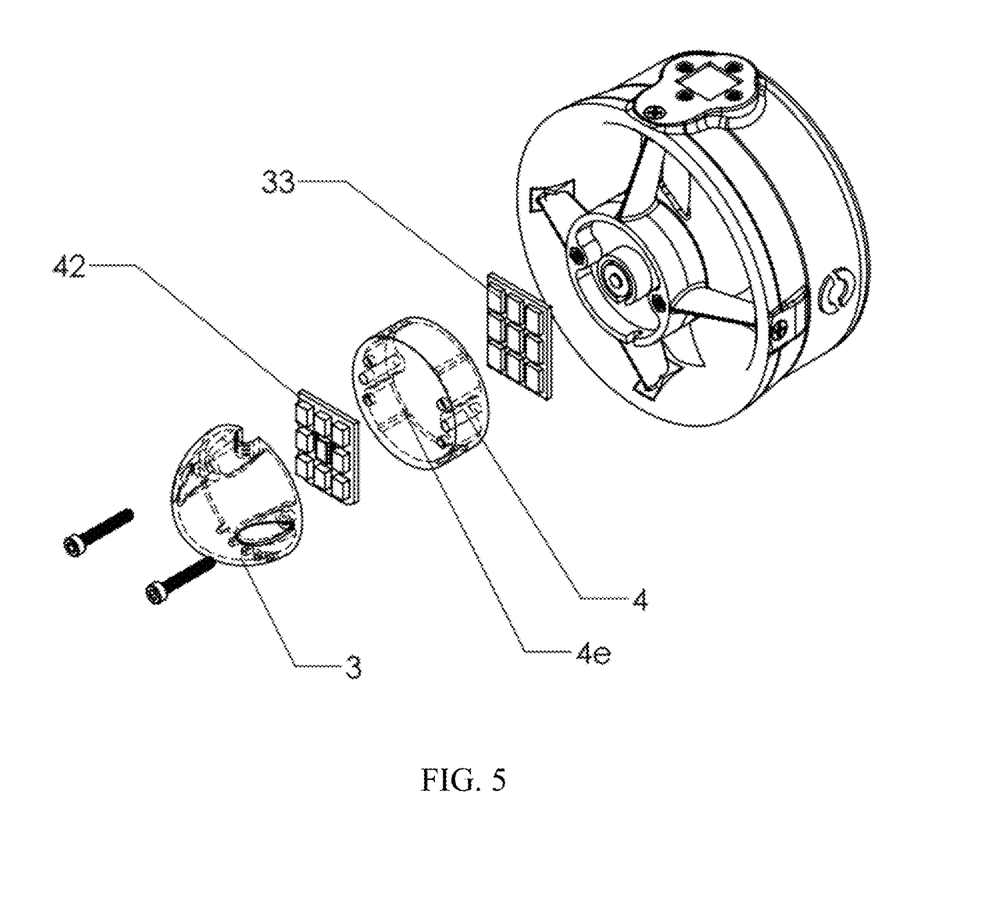
FIG. 5 is an exploded perspective view of an embodiment including an electronics unit, an electronic speed controller, and an electronic printed circuit board in the nose cone.

The nose cone 3 is connected to the front of the thruster to minimize drag. The nose cone has two nose cone mounting holes 12, allowing screws to be used to attach the nose cone to the stator assembly 1. Additional pieces such as the electronics unit 4 can be attached between the stator assembly 1 and the nose cone 3. A wire hole 13 is included in the nose cone to allow the wires necessary to power and control the thruster T to extend outside of the thruster body. In one embodiment of the invention, the nose cone is built of an optically translucent or transparent material and a light emitting diode (LED) is contained in the nose cone to provide a light for the submersible vehicle as shown in FIG. 5. The LED may be attached to a printed circuit board (PCB) 42 and other components such as LED controllers may be included on said PCB. The LED may be of the red-green-blue (RGB) type so that with an appropriate LED controller, the light may produce a wide range of colors. Alternatively, the nose cone may house a camera or other electronic sensor. The nose cone 3 may also be replaced with a mounting bracket so that the thruster can be mounted to a surface parallel to the plane of propeller rotation. The nose cone includes several small holes or slots that act as vents to allow water to enter and exit the nose cone.

The electronics unit 4 is cylindrical with a closed end 4e. The outer diameter of the electronics unit is more or less equal to the outer diameter of the stator assembly base 25 so that when the electronics unit is installed between the stator assembly and the nose cone 3 the outer surfaces are flush. The electronics unit has two holes 14 that allow screws to secure the nose cone and electronics unit to the stator assembly simultaneously. A brushless electronic speed controller 33, which includes a PCB (printed circuit board) and electronic components, is disposed within the electronics unit. The PCB and/or electronic components are protected from electrical shorts, abrasion, and corrosion by a protective coating such as an epoxy or silicon potting compound. The protective coating may be of a thermally conductive type so that heat generated by the electronic speed controller is transferred to the electronics unit material. Wires attach to the PCB and protrude from the protective coating to interface with the electromagnetic windings 35 and to provide power and commands. The electronics unit is constructed of a material that allows sufficient thermal conduction to cool the electronic speed controller 33. The electronics unit may be much larger than pictured and may house additional electronics for different purposes.

The electromagnetic windings 35 terminate to three wires, one per electromagnetic phase. The wires pass through a hole in the stator assembly base 25 and the wire ends are disposed in the space between the stator assembly and the electronics unit 4 or the nose cone 3 if the electronics unit is not included. If the electronics unit is used and includes an electronic speed controller, the wires are connected to the electronic speed controller. The power and signal wires for the electronic speed controller connect to a multiconductor cable that passes through the wire hole 13 in the nose cone. If the electronic speed controller is not used, the wires are directly connected to a multiconductor cable that passes through the wire hole 13 in the nose cone. The wire connections are solder connections that are sealed from the water by a plastic coating such as liquid electrical tape or epoxy.

The nozzle 5 is an annular ring with an inner diameter slightly larger than the diameter circumscribed by the propeller tip 2 providing an inlet and outlet for fluid flow. The cross sectional profile of the nozzle 5 is a hydrofoil shape designed to accelerate water speed as it is drawn past the propeller and to reduce propeller tip vortices. The hydrofoil shape may be of a common type such as those of the Kort type. The nozzle is designed to operate well in both forward and backward thruster conditions such as those expected in the normal operation of an ROV. The front of the nozzle has several recesses 19 that mate with the nozzle arms 6 of the stator assembly 1. A set of screw holes 8 allow screws to be used to fasten the nozzle to the stator assembly. The top of the nozzle includes a mounting protrusion 9 that provides threaded holes 10 and a flat surface to interface with the mounting bracket 29 or directly to a surface. The threaded holes 10 contain metal threaded inserts 11 to provide strong threads to interface with screws.

The tail cone 22 is a rounded cone positioned behind the propeller 2 and opposite of the nose cone 3 to reduce drag of the thruster. The tail cone is connected to the nozzle 5 by the tail cone arms 36. The tail cone arms are shaped to minimize hydrodynamic drag. In another embodiment of the invention, the tail cone is fixed to the propeller and there are no tail cone arms.

The mounting bracket 29 provides a mounting interface between the thruster assembly and the mounting surface 37. The mounting bracket is longer than the length of the thruster assembly and is more or less the same width as the nozzle mounting protrusion 9. Its thickness is small compared to its length and width however a thicker version could be made to provide greater distance between the thruster and the mounting surface. Mounting screw holes 30 are located at each end of the mounting bracket and can be used to secure the mounting bracket to the mounting surface. The mounting screw holes are spaced a distance that is greater than the length or width of the thruster assembly so that a screw driver may be used to tighten the screws without interfering with the thruster assembly. A center set of screw holes 31 and a rear set of screw holes 32 provide holes for screws that fix the mounting bracket to the thruster assembly. The center set of screw holes 31 is used when the bracket is mounted in the orientation shown in FIG. 2 so that the mounting screw holes 30 are positioned on either side of the nozzle and can be tightened with a screwdriver. The rear set of screw holes 32 is used when the bracket is mounted in the orientation shown in FIG. 3 so that the mounting screw holes 30 are positioned in front and behind the thruster assembly and can be tightened with a screwdriver. Additionally, the mounting bracket may include a hole to allow the electrical wires to pass through the bracket.

The thruster T has an electronic speed controller. The electronic speed controller 33 can be integrated into the thruster in the electronics unit 4 or may be separate from the thruster. To operate the thruster, an appropriate electrical signal is supplied to the electronic speed controller which in turn provides electricity to the electromagnetic windings 35, which are sealed from the water by a protective coating. The magnetic field that is generated produces a torque on the rotor assembly 26 which is co-rotatably connected to the propeller. As the rotor assembly turns, the electronic speed controller commutates the electrical current through the three phases of the electromagnetic windings to continually produce a torque on the rotor assembly. The back electromotive force is measured and used to sense the position of the rotor for proper timing. Alternatively, a hall effect or other sensor can be used to sense the position of the rotor assembly. The propeller blades 7 act to accelerate water through the nozzle 5 to produce thrust. The structure of the thruster acts to support and contain the rotor assembly and propeller while providing a physical shape that minimizes drag, is compact, and is attachable to a variety of surfaces. When submersed, water floods all cavities within the thruster so that there is no enclosed air and no pressurized cavities.

The embodiment of the invention described here is the preferred embodiment but there are a number of different embodiments. In another embodiment of the invention, the nozzle and its supporting arms are not present. This may be useful for high speed applications where the nozzle loses its effectiveness. The thruster could be mounted from the nose cone or a mounting structure extending from the nose cone. In such embodiment, the tail cone would be connected to the propeller. In another embodiment of the invention, control fins are positioned behind the nozzle to allow control of the vehicle through deflection of the control fins. The tail cone may be excluded in this case. The control fins may be positioned along one or more axes to provide control forces in one or more directions. The control fins may be controlled by electric servos or other means.

Figure 6:
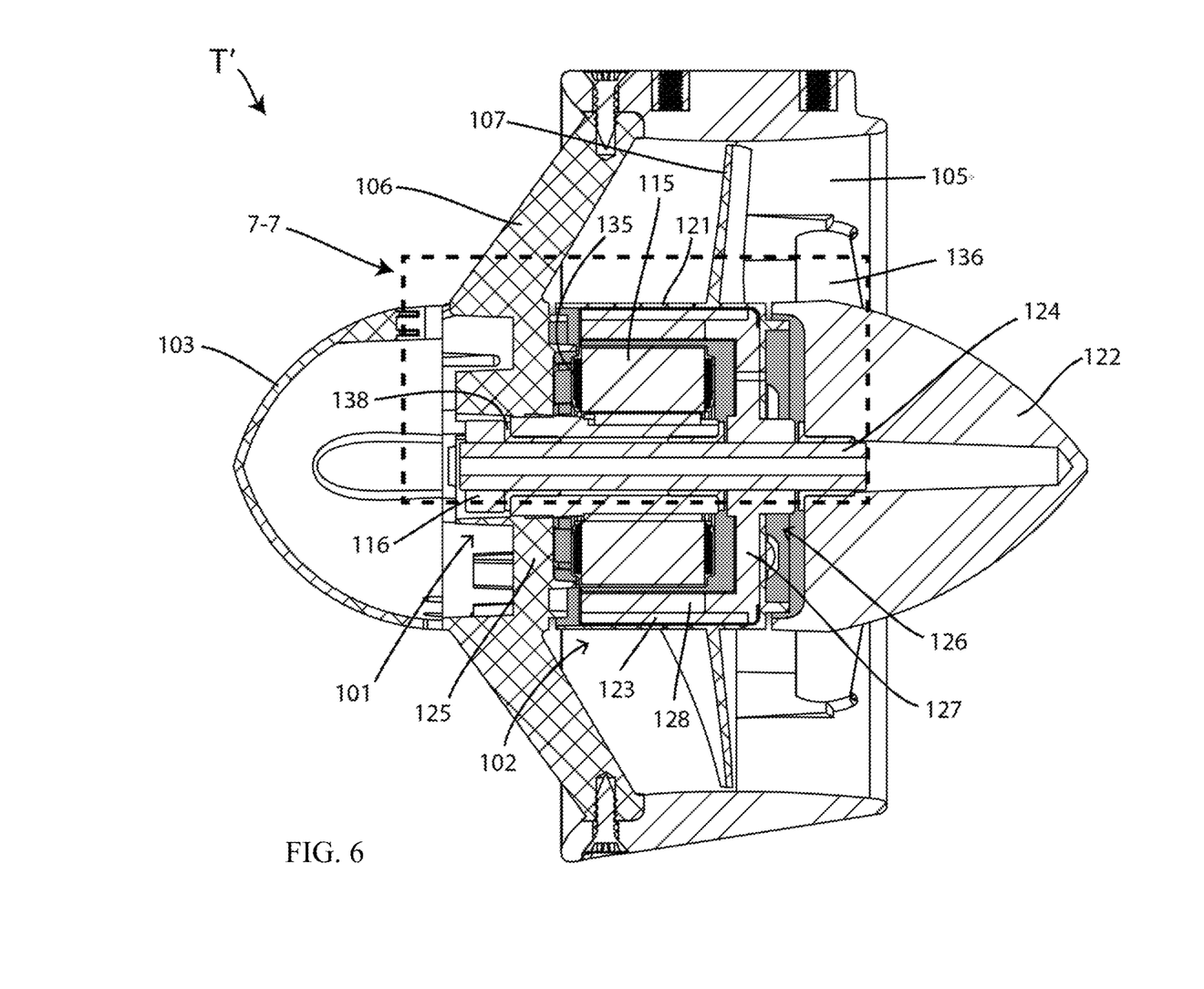
FIG. 6 is a cross-sectional view of another exemplary submersible electric thruster according to an embodiment of the invention.
Figure 7:
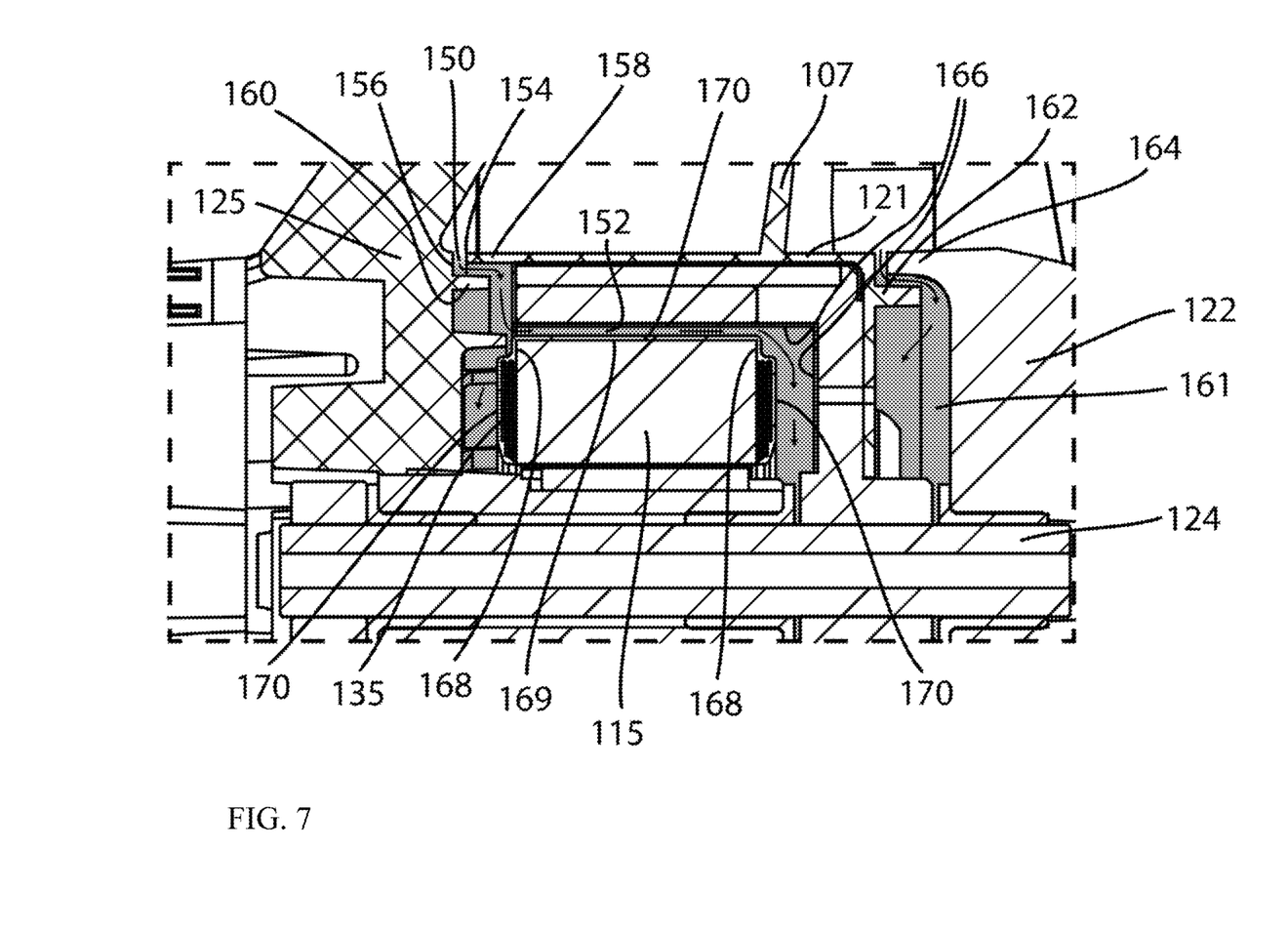
FIG. 7 is an enlarged cross-sectional view of the section 7-7 in FIG. 6

Turning now to FIGS. 6 and 7, another exemplary embodiment of a submersible electric thruster T' is shown. The thruster T' is substantially similar to or the same as the above-referenced submersible electric thruster T, and consequently the same reference numerals but indexed by 100 are used to denote structures corresponding to the same or similar structures in the respective thrusters T, T'. In addition, it is understood that the foregoing description of the thruster T is equally applicable to the T' except as noted below. It is furthermore understood that aspects of the thrusters T, T' may be substituted for one another or used in conjunction with one another where applicable.

As shown, the thruster T' is configured similarly to the previous embodiment of the thruster T to include a stator assembly 101, a rotor assembly 126, and a propeller 102. The thruster T' also may include a nozzle 105, a plurality of supporting arms 106 connecting the stator assembly 101 to the nozzle 105, a nose cone 103 (which may include an electronics unit, not shown), a tail cone 122, and/or a plurality of supporting arms 136 connecting the tail cone 122 to the nozzle 105. The stator assembly 101 may include a base 125, a bearing tube 138, bearings 116, a stator 115, and electromagnetic windings 135. The rotor assembly 126 may include a shaft 124, a ferrous ring 123, a rotor base 127, and one or more permanent magnets 128. The rotor base 127 may connect the shaft 124 to the ferrous ring 123 and magnets 128. The propeller 102 includes a hub 121 and one or more propeller blades 107. The propeller 102 is connected co-rotatably to the rotor assembly 126 and converts rotational kinetic energy into thrust.

Similarly to the previous embodiment of the thruster T, the thruster T' also is configured to allow water to flood the internal chamber(s) or cavities of the thruster to thereby reduce air-filled cavities and therefore enable operation at greater underwater depths. However, whereas the thruster T may allow such flooding of the internal chamber(s) containing the stator and windings by providing a relatively simple flow channel or gap between the hub and stator base, the thruster T' is configured to provide a more tortuous flow passage 150 for the water entering the internal chamber 152 containing the stator 115 and windings 135. Such a tortuous flow path may minimize debris, such as sand or particular matter, from entering the internal chamber(s), which could otherwise cause abrasion and damage to the components of the thruster. Such a tortuous flow passage 150 also may prevent string-like objects, such as fishing line or seaweed, from being drawn into the flow gap and causing entanglement or jams.

Similarly to the previous embodiment of thruster T, the flow passage 150 of the thruster T' is formed between an axial end portion 154 of the hub 121 and an adjacent portion 156 of the stator base 125, such that the flow passage 150 extends radially inwardly across a radially outer portion of the hub 121, thereby allowing the water surrounding the hub 121 to flow through the passage 150 and flood the internal chamber(s) of the thruster T' (with the flooded chamber(s) shown in the shaded regions in FIG. 6 and the flow path shown with directional arrows in the enlarged view of FIG. 7). In the illustrated embodiment of the thruster T', the axial end portion 154 of the hub and the adjacent portion 156 of the base each have axially extending projections 158 and 160 (respectively referenced in FIG. 7) that are concentric and/or that radially overlap with each other to form the flow passage 150 with a non-linear, S-shaped flow path that further restricts entanglement or the ingress of debris into the flooded chamber(s). Also as shown in detail in FIG. 7, the chamber 161 between the tail cone 122 and the hub 121 also may be flooded with water, and axially extending and radially overlapping projections 162 and 164 of the hub 121 and tail cone 122, respectively, may be provided to reduce entanglement or ingress of debris. Multiple layers of such overlapping elements may be used to further protect the thruster.

Because the thruster T' is configured in a similar manner to the previous embodiment of the thruster T to allow the internal chamber(s) at least partially containing the stator 115 and windings 135 to be flooded with water when submerged, the thruster T' also similarly includes at least one protective barrier 170 around the stator 115 and windings 135 to prevent the flooded water from contacting the stator and windings and causing an electrical short or corrosion. Such flooding of the chamber(s) includes, for example, the chamber 152 at least partially defined by internal surfaces 166 of the rotor assembly that are spaced apart from axial ends 168 and/or radially outer surface 169 of the stator 115. In this manner, because the flooded water may enter through the flow passage 150 and surround axial ends 168 and/or radially outer surface 169 of the stator 115 (as shown with directional arrows in FIG. 7), the at least one protective barrier 170 may be configured to extend radially inwardly to directly contact each of the axial ends 168 of the stator with an inner side of the barrier, and the barrier 170 also may extend axially to directly contact the radially outer surface 169 of the stator, such that corresponding outer sides of the at least one barrier 170 directly contact the flooded water to prevent the water from contacting the corresponding portion(s) of the stator 115 and/or windings 135. The at least one barrier may include one or more contiguous or segmented layers, in which such layer(s) may be coextensive, side-by-side, and/or overlying to provide such protection.

Similarly to the previous embodiment of the thruster T, the protective barrier 170 of the thruster T' is preferably formed to encapsulate at least the stator 115 and windings 135 without enclosing any air cavities, which further enhances the performance of the thruster at greater underwater depths. For example, as discussed above, the protective barrier may be an epoxy coating, such as a liquid epoxy compound or other liquid polymer in which the stator and windings are dipped to allow the protective barrier to fill small air gaps between the windings. Furthermore, a vacuum degassing method may be utilized on the protective barrier to further minimize air bubbles trapped in the coating. Alternatively or additionally, at least the stator and windings may be overmolded with a plastic coating. The plastic overmolding may be configured to fully encapsulate at least the outer surfaces of the stator to protect the stator from electrical shorts, corrosion, abrasion, and/or electrical current leakage. This could be done though injection molding or other plastic fabrication techniques. For example, the overmolding process may be performed on the stator and windings alone or may be performed on an assembly of one or more of the stator, windings, the stator bearing tube, the stator base, and the electrical cable or wires. The stator base also may be formed as part of the overmolding process to minimize the number of injection molding tools that may otherwise be required.

The invention is intended for use as a thruster for underwater and surface vehicles but can also be repurposed for other uses. Other uses may include but are not limited to water pumps and liquid mixing. In a further embodiment of the invention a larger propeller is used that is optimized for aerial propulsion. Such a device could be used for aircraft and share the same water resistant characteristics as the thruster.

It is also to be understood that the present invention has been described in connection with what is considered the most practical and preferred embodiment, but that this invention is not limited to the disclosed embodiment but is intended to cover various arrangements included within the spirit and scope of the broadest interpretation so as to encompass all such modifications and equivalent arrangements.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed:

1. A method of manufacturing an electrically-operable unmanned fully-submersible underwater vehicle, comprising:
    providing at least a hull of the fully-submersible underwater vehicle;
    manufacturing a gearless water-cooled submersible brushless electric thruster, including:
        providing a stator assembly having electrical windings;
        applying a protective barrier directly to the electrical windings such that the barrier covers the electrical windings;
        providing a rotor assembly having a plurality of magnets and a rotatable shaft configured to co-rotate together, the rotor assembly forming an internal cavity with the rotatable shaft extending at least partially within the internal cavity along a longitudinal axis, and with the plurality of magnets being arranged radially outwardly of at least a portion of the internal cavity about the rotatable shaft;

connecting a propeller to the rotor assembly such that the propeller is configured to co-rotate with the rotor assembly, wherein the propeller has at least one propeller blade configured to generate thrust and propel the underwater vehicle during operation of the gearless water-cooled submersible brushless electric thruster in-when under water;

assembling the stator assembly and the rotor assembly together, such that:
(i) the electrical windings are disposed within the internal cavity of the rotor assembly, are arranged radially inwardly of the plurality of magnets, and are arranged radially outwardly about the rotatable shaft;
(ii) the gearless water-cooled submersible brushless electric thruster provides a flow passage that is configured to allow the internal cavity to be flooded with water when the thruster is submerged, and the protective barrier covering the windings is configured to prevent the flooded water from contacting the windings, and
(iii) the plurality of magnets are configured to rotate about the electrical windings and protective barrier when driven by electromagnetic forces provided by the electrical windings during operation of the thruster in water thereby rotating the propeller and generating sufficient thrust to propel the fully-submersible underwater vehicle when under water;

coupling the stator assembly to an annular nozzle such that the rotor and stator assemblies are disposed radially inwardly of the annular nozzle, wherein the annular nozzle has an inlet opening and outlet opening configured to allow the water to flow therethrough; and mounting the gearless water-cooled submersible brushless electrical thruster to the hull of the fully-submersible underwater vehicle such that the thrust generated by the thruster translates to movement of the fully-submersible underwater vehicle when in use under water.

2. The method according to claim 1, wherein the nozzle is coupled to the hull via a mounting interface of the nozzle.

3. The method according to claim 2,
wherein the mounting interface of the nozzle is located on a radially outer surface of the nozzle,
wherein the mounting interface includes a flat surface and at least one fastener receiver, and
wherein the nozzle is coupled to a mounting bracket via the mounting interface, and the mounting bracket is coupled to the hull with at least one fastener.

4. The method according to claim 1, wherein the applying the protective barrier includes completely covering the electrical windings without enclosing an air cavity between the electrical windings and the protective barrier, wherein the protective barrier makes direct contact with the windings and is configured to make direct contact with the flooded water in the internal cavity to thereby prevent the flooded water from contacting the electrical windings when the thruster is submerged.

5. The method according to claim 4, wherein the applying the protective barrier includes encapsulating the windings with a plastic coating and vacuum degassing the plastic coating that to eliminate air cavities in the plastic coating.

6. The method according to claim 1, wherein the applying the protective barrier includes applying a plastic coating in liquefied form directly to the electrical windings such that upon solidification of the plastic coating the plastic coating covers the electrical windings.

7. The method according to claim 6, wherein the applying the plastic coating includes dipping the electrical windings in an epoxy.

8. The method according to claim 6, wherein the applying the plastic coating includes overmolding the plastic coating on the electrical windings.

9. The method according to claim 1, wherein the flow passage extends radially inwardly between the rotor assembly and the stator assembly, the flow passage being configured to allow water to flow into and flood the internal cavity when the thruster is submerged.

10. The method according to claim 9, wherein the flow passage is formed between an axial end portion of a hub of the propeller and an adjacent portion of a base of the stator assembly.

11. The method according to claim 10, wherein the axial end portion of the hub and the adjacent portion of the base of the stator assembly each have axially extending projections that radially overlap with each other to form the flow passage with a tortuous path that is configured to restrict the ingress of debris into the internal cavity.

12. The method according to claim 1, further comprising coupling a nose cone to a forward end portion of the stator assembly such that the nose cone is forward of the nozzle.

13. The method according to claim 1, wherein:
the providing the stator assembly includes:
the stator assembly having a stationary base extending radially relative to the longitudinal axis, and having a stationary support tube projecting from the base in which the support tube extends in a direction of the longitudinal axis and supports the windings;
the support tube includes an opening at an axial end thereof, and an internal passage extending from the opening along the longitudinal axis; and
the assembling the stator assembly and the rotor assembly together includes:
inserting the rotatable shaft of the rotor assembly through the opening and into the internal passage of the support tube.

14. The method according to claim 13, wherein the stator assembly is coupled to the nozzle via one or more arms that extend radially outwardly relative to the base of the stator assembly.

15. The method according to claim 14,
wherein the one or more arms have a hydrofoil shape that is configured to minimize drag through the water, and
wherein the nozzle is a Kort nozzle having a hydrofoil shape that is configured to accelerate water speed as the water is drawn past the propeller.

16. The method according to claim 13, wherein:
the providing the stator assembly includes the stator assembly having static bearings mounted at opposite ends of the support tube; and
the assembling the stator assembly and the rotor assembly together includes the rotatable shaft of the rotor assembly is inserted through and supported by the static bearings when the rotatable shaft is inserted into the internal passage of the support tube.

17. The method according to claim 13, wherein:
the providing the stator assembly includes the stator assembly having steel laminations forming a plurality of radially extending arms that are circumferentially spaced apart from each other, in which the electrical windings are wound around each of the plurality of radially extending arms;

the applying the protective barrier includes covering the electrical windings and the radially extending arms such that circumferentially spaced apart and axially extending gaps are formed between respective covered segments of the windings and arms; and the assembling the stator assembly and the rotor assembly together is such that the circumferentially spaced apart and axially extending gaps form flow channels for the flooded water in the internal cavity when the thruster is submerged.

18. The method according to claim 1, wherein:

the providing the rotor assembly includes providing a rotatable hub having a cylindrical wall extending circumferentially about the rotatable shaft, and having an end wall connected to the cylindrical wall in which the end wall extends transverse to the longitudinal axis and in which the rotatable shaft is fixed to the end wall for co-rotation therewith, wherein the end wall and the cylindrical wall are configured to enclose respective portions of the internal cavity to prevent egress of water from the internal cavity across the end wall and the cylindrical wall, and wherein an opening to the internal cavity is formed at an end of the cylindrical wall opposite the end wall thereby allowing the flow of water to the internal cavity when the thruster is submerged.

19. The method according to claim 18, wherein:

the providing the rotatable hub includes the cylindrical wall of the hub including a ferrous ring radially outwardly surrounding the plurality of magnets, and the end wall including a rotor base to which the rotatable shaft is connected, and wherein a plurality of axially extending and circumferentially spaced apart slots are formed in a portion of the hub between the ferrous ring and a radially outer surface of the hub.

20. The method according to claim 1, wherein the manufacturing the gearless water-cooled submersible brushless electric thruster, further includes:

the stator assembly being coupled to the nozzle via a first set of one or more arms that extend radially outwardly relative to a base of the stator assembly; and a stationary tail section being coupled to the nozzle via a second set of one or more arms that are axially offset relative to the first set of one or more arms;

wherein the rotor assembly is disposed between the stator assembly and the stationary tail section.

21. A method of manufacturing an electrically-operable unmanned fully-submersible underwater vehicle, comprising:

providing at least a hull of the fully-submersible underwater vehicle;

manufacturing a gearless water-cooled submersible brushless electric thruster, including:

providing a stator assembly having electrical windings, and applying a protective barrier directly to the electrical windings, wherein the applying the protective barrier includes applying a plastic coating in liquefied form directly to the electrical windings such that upon solidification of the plastic coating the plastic coating covers the electrical windings; and wherein the stator assembly further includes a stationary base extending radially relative to a longitudinal axis of the thruster, and a stationary support tube projecting from the base in which the support tube extends in a direction of the longitudinal axis, and in which the electrical windings are supported by the stationary support tube and the stationary base, wherein the support tube includes an opening at an axial end thereof, and includes an internal passage extending from the opening along the longitudinal axis;

providing a rotor assembly including a rotatable hub, a rotatable shaft, an internal cavity, a plurality of magnets, and at least one propeller blade; wherein:

the rotatable shaft extends at least partially within the internal cavity along the longitudinal axis of the thruster, the rotatable hub includes a cylindrical wall extending circumferentially about the rotatable shaft, and includes an end wall connected to the cylindrical wall in which the end wall extends transverse to the longitudinal axis and in which the rotatable shaft is fixed to the end wall for co-rotation therewith, the plurality of magnets are operatively mounted to the cylindrical wall for co-rotation therewith, wherein the plurality of magnets are arranged radially outwardly of at least a portion of the internal cavity about the rotatable shaft;

the end wall and the cylindrical wall enclose respective portions of the internal cavity, and wherein an opening to the internal cavity is formed at an end of the cylindrical wall opposite the end wall thereby allowing flow of water to the internal cavity when the thruster is submerged;

the at least one propeller blade is operatively coupled to the rotatable hub for co-rotation therewith, the at least one propeller blade being configured to generate thrust and propel the underwater vehicle during operation of the thruster when under water;

assembling the stator assembly and the rotor assembly together, such that:

the rotatable shaft of the rotor assembly is inserted through the opening and into the internal passage of the support tube of the stator assembly;

the electrical windings are arranged within the internal cavity of the rotor assembly, the electrical windings being arranged radially inwardly of the plurality of magnets and radially outwardly about the rotatable shaft;

a flow passage is provided between the rotor and stator assemblies, the flow passage being configured to allow the internal cavity to be flooded with water when the thruster is submerged, and the protective barrier covering the windings is configured to prevent the flooded water from contacting the windings, and the plurality of magnets are configured to rotate about the electrical windings and protective barrier when driven by electromagnetic forces provided by the electrical windings during operation of the thruster in water thereby rotating the propeller and generating sufficient thrust to propel the fully-submersible underwater vehicle when under water;

coupling the stator assembly to an annular nozzle such that stator assembly is disposed radially inwardly of the annular nozzle, wherein the annular nozzle has an inlet opening and outlet opening configured to allow water to flow therethrough; and mounting the gearless water-cooled submersible brushless electrical thruster to the hull of the fully-submersible underwater vehicle such that the thrust generated by the thruster translates to movement of the fully-submersible underwater vehicle when in use under water.

22. The method according to claim 21, wherein:

the rotor assembly includes the cylindrical wall of the hub including a ferrous ring radially outwardly surrounding the plurality of magnets;

the stator assembly includes the stator assembly having static bearings mounted at opposite ends of the support tube;

the rotatable shaft of the rotor assembly is inserted through and supported by the static bearings when the rotatable shaft is inserted into the internal passage of the support tube;

the stator assembly includes steel laminations forming a plurality of radially extending arms that are circumferentially spaced apart from each other, in which the electrical windings are wound around each of the plurality of radially extending arms, the protective barrier covers the electrical windings and the radially extending arms such that circumferentially spaced apart and axially extending gaps are formed between respective covered segments of the windings and arms, in which the circumferentially spaced apart and axially extending gaps form flow channels for the flooded water in the internal cavity when the thruster is submerged;

the stator assembly is coupled to the nozzle via a first set of one or more arms that extend radially outwardly relative to the base of the stator assembly; and a stationary tail section is coupled to the nozzle via a second set of one or more arms that are axially offset relative to the first set of one or more arms;

wherein the rotor assembly is disposed between the stator assembly and the stationary tail section.

* * * * *